United States Patent [19]

Class et al.

[11] Patent Number: 5,361,212
[45] Date of Patent: Nov. 1, 1994

[54] DIFFERENTIAL GPS LANDING ASSISTANCE SYSTEM

[75] Inventors: Kim A. Class, Coon Rapids; Randolph G. Hartman, Plymouth; Brett J. Helgeson, Shorewood, all of Minn.

[73] Assignee: Honeywell Inc., Minneapolis, Minn.

[21] Appl. No.: 970,320

[22] Filed: Nov. 2, 1992

[51] Int. Cl.⁵ .............................................. G06F 15/48
[52] U.S. Cl. .............................. 364/428; 244/114 R; 340/947; 364/460; 342/357; 342/33
[58] Field of Search ............... 244/114 R; 340/988, 340/945, 947, 989; 364/428, 424.06, 424.01, 460, 449; 342/357, 33, 34, 35

[56] References Cited

U.S. PATENT DOCUMENTS

| | | | |
|---|---|---|---|
| 4,613,864 | 9/1986 | Hofgen | 364/449 |
| 4,866,450 | 9/1989 | Chisholm | 342/33 |
| 4,894,655 | 1/1990 | Joguet et al. | 340/945 |
| 4,954,833 | 9/1990 | Evans et al. | 342/357 |
| 5,216,611 | 6/1993 | McElreath | 364/428 |

Primary Examiner—Mitchell J. Hill
Assistant Examiner—Christopher T. Ellis
Attorney, Agent, or Firm—Robert A. Pajak

[57] ABSTRACT

An aircraft landing system is disclosed in which a differential GPS global positioning system is employed. A ground station, located in the vicinity of one or more landing strips, includes a GPS receiver and a data link transmitter for transmitting GPS correction data and also the global position of two points which define a desired aircraft glide path associated with a particular landing strip. The system further includes aircraft equipment comprising a receiver for receiving the correction data and the global position of the two glide path points, and a GPS receiver. The aircraft equipment further includes a computer for determining a corrected global position of the aircraft as a function of the aircraft GPS range data and the correction data, and subsequently determines the lateral deviation and vertical deviation from the glide path defined by the two glide path points.

23 Claims, 5 Drawing Sheets

DIFFERENTIAL GPS LANDING ASSISTANCE SYSTEM

BACKGROUND OF THE INVENTION

This invention pertains to a landing assistance system for aircraft. More particularly, the present invention is related to landing assistance systems which assist control of an aircraft, either manually or by autopilot, for piloting an aircraft along a predetermined glide path associated with a particular landing strip or runway. The invention is particularly directed to an aircraft landing system wherein the precise position of the aircraft and its deviation from a prescribed glide path is determined in a relatively simple yet highly accurate manner.

Today's commercial aircraft commonly incorporate MLS (Microwave Landing System) or ILS (Instrument Landing System). These landing assistance systems are particularly important during those aircraft landings under adverse visibility conditions. Such systems, therefore, assist the pilot in enhancing safe landings.

In ILS and MLS type landing assistance systems, associated with each landing strip is the employment of electromagnetic wave generating equipment for radiating a plurality of electromagnetic wave beams having electromagnetic characteristics which define a glide path for a specific landing strip. The aircraft includes appropriate signal receiving equipment depending upon the system employed for determining the position of the aircraft relative to the glide path as defined by the electromagnetic wave generating equipment. In turn, onboard aircraft signal processing equipment may be utilized to provide data to the human pilot through landing indicating equipment, or else be given to an automatic pilot control system, referred to as an autopilot.

Another type of landing assistance system using satellite positioning data is shown and described in U.S. Pat. No. 4,894,655, issued to J. C. Jognet et al. The landing assistance system described therein incorporates a differential GPS satellite positioning system well established and known in the prior art which incorporates a fixed ground station having a known reference position. The fixed ground station is located in the vicinity of a landing strip. The fixed ground station contains a receiver for receiving satellite signal data from a plurality of satellites from which pseudo range data and pseudo range rate data, herein referred to as satellite data, are derived therefrom. From the satellite range data, a measured or estimated global position of the ground station receiver may be determined. In differential GPS systems, the ground station further includes a computing device for comparing the theoretical range between the known reference global position of the ground station and the position of the satellites to derive correction data representative of the error, if any, in the pseudo range and pseudo range rate data. In turn, other remote GPS stations can correct their calculated position by correcting the satellite data with use of the correction data to determine a "corrected" global position of the remote GPS station. The fixed ground station also includes a data link signal transmitter, e.g., an RF transmitter, for transmitting on a MLS radio channel GPS correction data, landing strip data associated with the landing strip including the magnetic alignment, the coordinates of the desired approach end of the landing strip, and the identity of the landing strip. Further, as part of the landing assistance system, the aircraft incorporates an onboard receiver for determining its calculated position based on substantially the same GPS-like data. Secondly, the onboard equipment also includes a receiver for receiving the correction data and the aforementioned landing strip data. In turn, a conventional onboard computer determines the landing guidance data which may be given to the human pilot by landing indicating equipment, or utilized as inputs to an autopilot.

A disadvantage of the aforementioned GPS aided landing system is the inherent ambiguity in the magnetic alignment heading of the runway as well as a clear definition of glide path.

BRIEF DESCRIPTION OF THE INVENTION

An object of the present invention is to obviate any ambiguity of landing zone data transmitted to an aircraft incorporating GPS assisted landing approach equipment.

In the present invention, a ground station is located in the vicinity of the landing strip and has a known reference global position. The ground station includes a global positioning system forming in part a differential global positioning system well known in the art. The ground station includes a receiver for determining a calculated global position of the ground station as a function of the satellite range data measurements derived from the data received from selected ones of the GPS system satellites. The ground station further includes a computer or the like for determining real time correction data characteristic of any errors in the range data measurements which cause any deviation between the reference global position and the calculated global position of the ground station. Further, the ground station includes a data link apparatus such as a radio signal transmitter for transmitting the correction data and also the global position of at least first and second points which define a selected glide path intended to be followed by aircraft for the particular landing strip.

The landing system in accordance with the present invention further includes a station onboard the aircraft. The onboard equipment includes (i) a first receiver for receiving satellite signals for determining satellite range data derived from the satellite signals, and (ii) a second receiver employed for receiving data from the dara link apparatus so as to receive the correction data and the actual global position of the first and second points which define the glide path associated with a particular landing strip. Lastly, the onboard station includes a computing means for processing the correction data and the global position of the first and second points, and the satellite range data for (i) deriving a corrected global position of the aircraft as a function of the correction data and the aircraft satellite range data, and (ii) deriving the lateral deviation and vertical deviation of the corrected global position of the aircraft from the selected glide path as a function of the actual global position of the first and second points and the corrected global position of the aircraft.

DETAILED DESCRIPTION OF THE INVENTION

Global positioning systems incorporating the use of satellites are now well known in the art. Such systems, for example NAVSTAR-GPS (Global Positioning System), are rapidly being utilized for a determination of the position of mobile units, for example, among others, land vehicles, aircraft, and survey equipment. Common to these global positioning systems is the use of a receiver on a mobile unit for receiving particular data transmitted from a plurality of satellites from which the satellite range data, i.e., the pseudo range and pseudo range rate data, may be determined with respect to each of a plurality of satellites. Further, from the satellite range data and known position of the satellites at the time of transmission of the data, the position of the mobile unit in the World Geodetic System Coordinates may be determined. Herein, it should be recognized by those skilled in the art that the World Geodetic System is an Earth-centered, Earth-fixed coordinate system, which can be converted to any other coordinate system the user requires. Sometimes, the aforementioned coordinate system is referred to as the WGS84 earth centered, earth fixed, rectangular coordinate frame. Herein, the World Geodetic System coordinates should be presumed.

Figure 1:
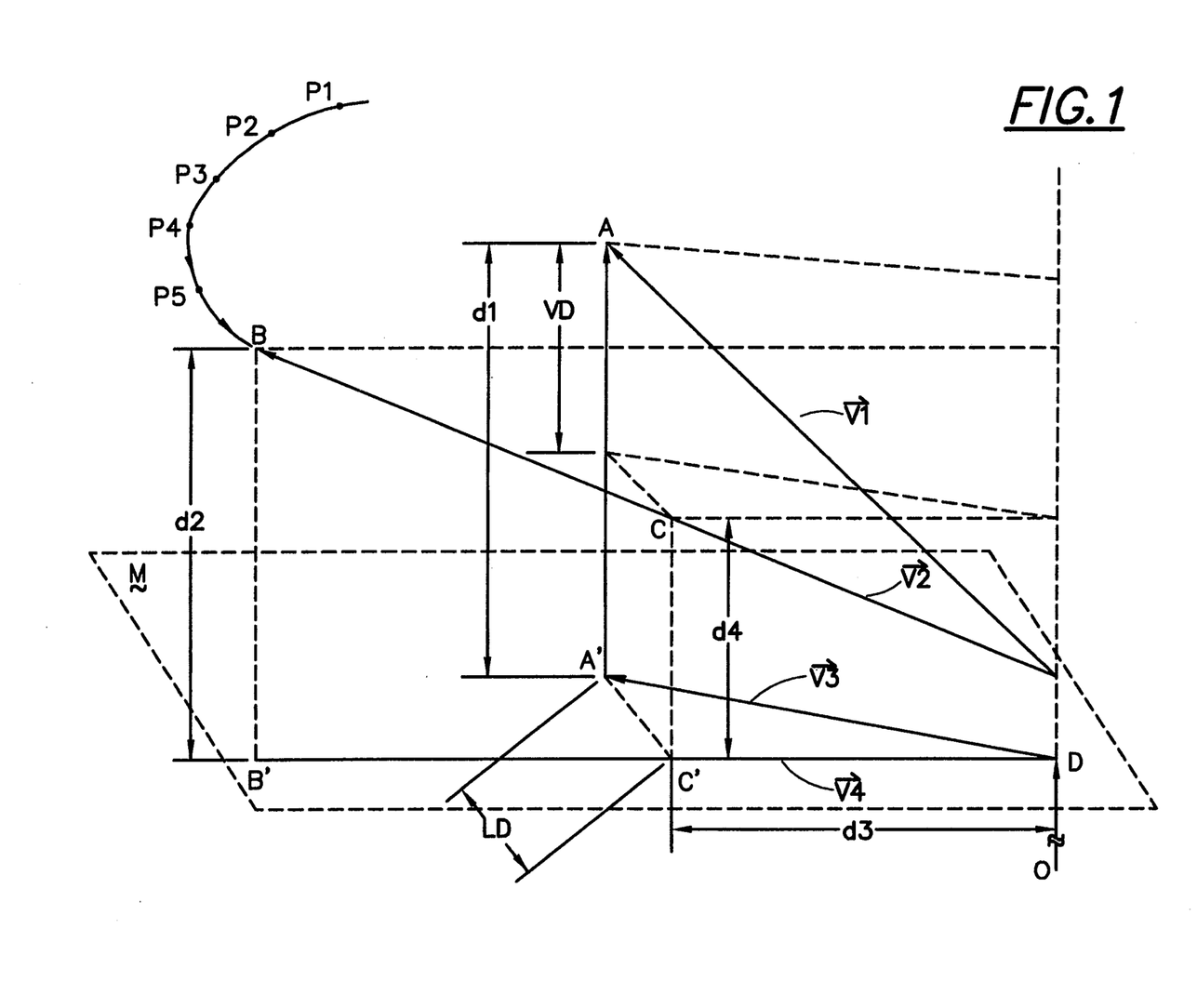
FIG. 1 is a perspective illustration of one embodiment of the inventive system of the present invention depicting the geometric relationship in a three dimensional coordinate system of the component parts thereof with respect to the airport landing strip and an approaching aircraft.

Referring now to FIG. 1, a first preferred embodiment of the subject inventive system is disclosed which will serve to illustrate the basic technique common to all forms of the invention. Further, in the exposition which follows, all coordinates of the points referred to are assumed to be in the World Geodetic System as are generally available in GPS systems of the variety generally described above.

Referring now to the Drawing of FIG. 1, it is desired that an aircraft landing on a particular landing strip follow a selected glide path as defined by the line segment between points B and D. Point D is herein referred to as the runway threshold crossing point and lies in a plane M which is perpendicular to a vector passing through the Earth Center and the runway threshold crossing point D. Point A is defined as the present position of the aircraft. Points B' and A' correspond to the projection of points A and B normal to the plane M. In the exposition which follows, all projection are those normal to plane M, or alternatively projections normal to a line segment or vector.

Terms commonly used with ILS and MLS landing assistance systems are vertical and lateral deviation, the latter sometimes referred to as cross-track error. These terms are all related to the "center" electromagnetic beam which defines the glide path in a manner as aforesaid. In the present exposition, lateral deviation is defined as the lateral distance from the desired ground track, where the desired ground track is defined as the projection of the glide path BD normal to the plane M and is shown as line segment B'D. In FIG. 1, the lateral deviation, "LD", is illustrated as line segment A'C', the normal drawn from point A' to line segment B'D, i.e., the desired ground track Point C' corresponds to the projection of point C on line segment BD, where line segment CC' is normal to the plane M. Lastly, vertical deviation, "V", is the difference between the altitude of the aircraft at point A and the altitude at point C as already defined.

As is well known to those skilled in the art, knowing quantities of lateral deviation and vertical deviation from the desired glide path is sufficient information for deriving signals appropriate for either landing signal indication equipment or autopilot.

Figure 2:
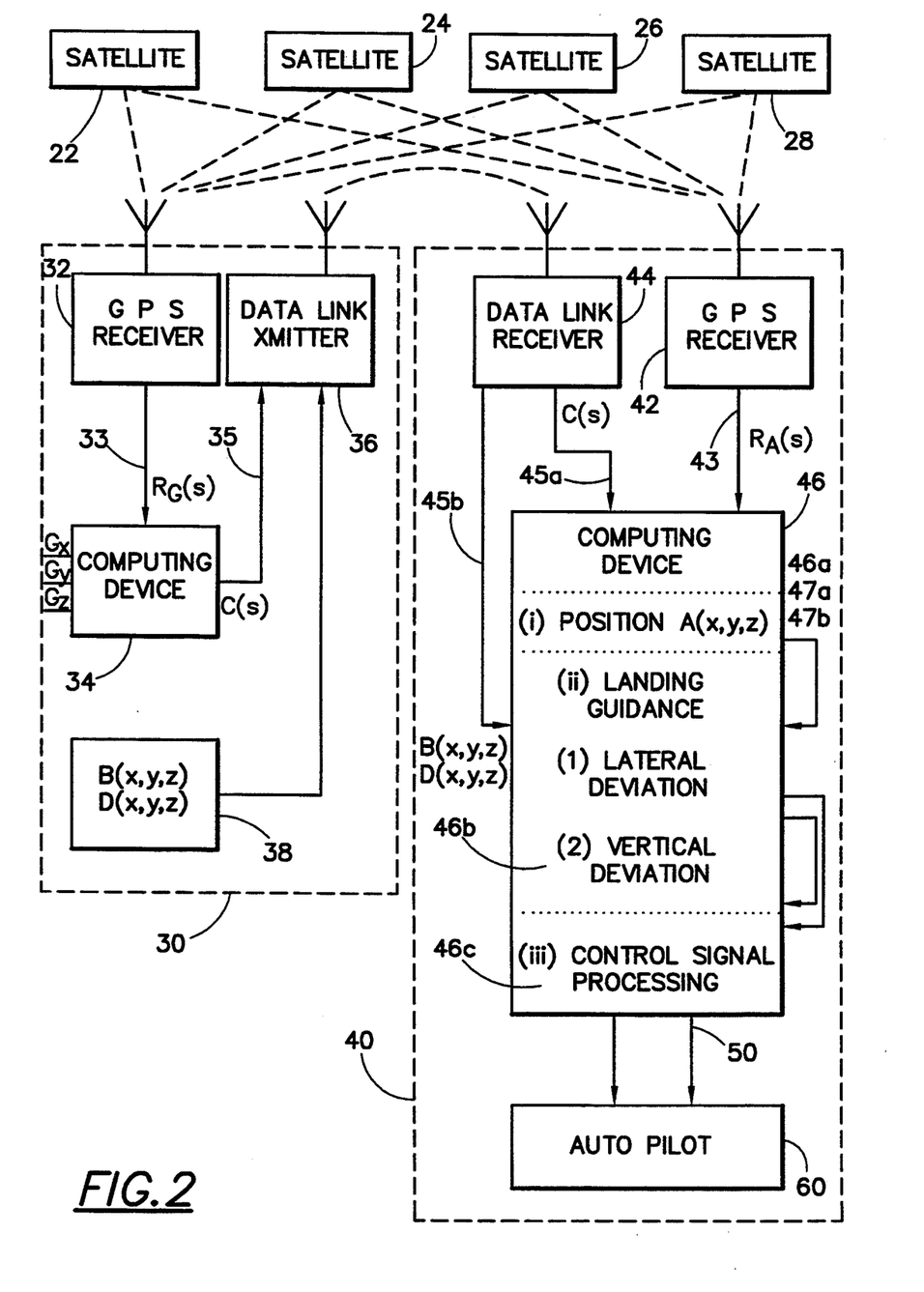
FIG. 2 is block diagram of one embodiment of the present invention.

Illustrated in FIG. 2 is a landing system in accordance with the present invention. Thereshown are a plurality of satellites 22, 24, 26 and 28 which each transmit signals containing data for determining satellite range data between a remote receiver and each one of the plurality of satellites. Ground station 30 includes a GPS receiver 32, a computing device 34 and data link transmitter 36. GPS receiver 32 may be any of a variety of GPS receivers well known in the art for selectively receiving a plurality of satellite signals for subsequent determination of a calculated global position of the ground station as a function of the satellite range data, i.e., the pseudo range and pseudo range rate data derived from signals from selected ones of the satellites in well known manner. GPS receiver 32 includes an output 33 presented to computing device 34 for providing data representative of the satellite range data derived from the satellite signals as measured from the ground station, and is designated in FIG. 2 as "$R_G(s)$". In turn, computing device 34 receives the satellite range for determining, if so desired, the coordinates of the ground station, identified as G (x, y, z) which represents particular coordinates $G_x$, $G_y$ and $G_z$.

Computing device 34 further receives input data representative of the actual coordinates of the ground station, namely $G'_x$, $G'_y$ and $G'_z$. At a particular instant, computing device 34 processes the satellite range data on signal line 33 with the known ground station coordinates for deriving satellite correction data designated "C(s)", and provides a data output indicative thereof on signal line 35. Here C(s) is the usual satellite correction data associated with differential GPS systems known in the art, and generally represents those satellite positioning systems errors contained in the satellite range data. Such errors include, among others, errors caused by the satellite clocks, the satellite's position, and ionospheric and atmospheric delays. As is well understood in the art, a second satellite signal receiver in the vicinity of the ground station may correct it's range and range rate data utilizing the satellite correction data in order to calculate a more accurate calculated global position of the second satellite signal receiver.

The data link transmitter 36 serves to transmit the correction data to any mobile unit which includes a receiver means for establishing the data link between the ground station and the mobile unit. The data link transmitter may be any of a variety of radio transmitters, or the like, for establishing the data link between the ground station and the mobile unit.

In the present invention, the mobile unit is an aircraft indicated in FIG. 2 by the dashed block 40 which includes a GPS receiver 42 and a data link receiver 44. GPS receiver 42, similar to receiver 32, provides an output on signal line 43 representative of the satellite range data derived from the satellite signals as measured from the aircraft position, and is designated in FIG. 2 as "$R_A(s)$".

Data link receiver 44 receives as data from data link transmitter 36, the transmitted data including the correction data C(s) and other such data associated with differential GPS systems. Data link receiver 44 presents this on the aircraft on signal line 45b, which in turn is presented as an input to computing device 46. Computing device 46 includes computing section 46a which is intended to compute a corrected global position of the air craft A (x, y, z) as a function of the satellite range data $R_A(s)$ and the correction data C(s) in accordance with well known procedures for differential GPS positioning systems. As figuratively illustrated in FIG. 2, computing device 46 generates an output representative of the corrected global position of the aircraft designated A (x, y, z), and the computing device 46 makes use of such information as indicated by the arrow 47a.

It should be recognized by those skilled in the art that GPS receiver 42 and GPS receiver 32 are substantially the same and may be commonly purchased from the TRIMBLE firm and many other firms as known to those skilled in the art. Further, the description of the block diagram illustrated in FIG. 2 refers to separate computing sections, signal lines, and specific blocks, etc. However, as is known to those skilled in the art, there are a variety of known analog and digital implementations, including microprocessor based systems, for transferring and processing data in accordance with the present invention.

It also should be recognized by those skilled in the art that the preceding exposition has generally described a differential GPS system wherein the ground station transmits correction data C(s) in the form of satellite range and range rate data errors, and the aircraft corrects the GPS receiver range and range rate data before the aircraft position is first calculated. However, it should be understood that other differential GPS schemes beyond that shown herein are within the scope of the present invention. Therefore, the differential GPS system of FIG. 2 has only been illustrated in a manner to facilitate an understanding of the present invention, and therefore is only exemplary in nature.

In accordance with the present invention, ground station 30 is intended to be located in the vicinity of the landing strip in order to enhance the differential GPS solution for the aircraft's position A (x, y, z). Also, herein the correction data has been derived by the computing device 34 at the ground station and subsequently transmitted by the data link transmitter 36. As is well understood in the art, the actual correction data could be computed in computing device 46 by data transmission of the calculated global position of the ground station and the known position of the ground station G' (x, y, z), as well as other identifying data so as to optimize the corrected global position of the aircraft, specifically that designated by A (x, y, z). All such schemes are intended to be within the spirit and scope of the present invention.

As indicated earlier, associated with the landing strip is a selected desired glide path for aircraft approaches, as already depicted in FIG. 1. This includes the orientation of the ground track (i.e., line segment B'D) relative to World Geodetic System, the glide slope angle (the angle between line segments B'D and glide path line segment BD), and, of course, the glide path itself including the runway threshold crossing point D and point B, where points B and D define the desired glide path. All of this information may be supplied to the aircraft through the data link transmitter 36 by transmitting only the desired flight path coordinates B (x, y, z) and the runway threshold crossing point D (x, y, z). In the preferred embodiment, the runway threshold crossing point is generally a point in space having an altitude of approximately 50 feet from the Earth's surface and the glide slope angle is typically 3°. However, in the present invention, any of these parameters may be changed at any time by simply designating the geodesic coordinates B (x, y, z) and the runway threshold crossing point D (x, y, z).

Again referring now to FIG. 2, data link receiver 44 includes data output means 45b for presenting data inputs B (x, y, z) and D (x, y, z) to computing device 46.

Computing device 46 serves multifunctions by appropriately executing a set of instructions in a manner well known in the art. For illustrative purposes, computing device 46 includes "sections" for executing certain tasks, and generally refers to portions of a computer program. Computing device 46 includes means for processing the correction data, C(s), the actual global position of the points B and D, and the calculated global position of the aircraft for (i) deriving a corrected global position of the aircraft A (x, y, z) as a function of the correction data, namely C(s) and the satellite range data $R_A(s)$, and (ii) derives the lateral deviation, "LD", and the vertical deviation, "VD", between the corrected global position of the aircraft and the selected glide path (BD) as a function of the actual global position of points B and D, and the corrected global position of the aircraft A (x, y, z) in a manner as will now be described.

First, the global position correction section 46a of computing device 46 calculates the corrected global position of the aircraft A (x, y, z). The determination of the corrected global position A (x, y, z) is done in a manner well known in the art in differential GPS, and will not be described herein.

The landing guidance section 46b for calculating the lateral and vertical deviation will now be mathematically described with reference to FIG. 1. It should be assumed in the following exposition that computer means 46 includes the necessary software and hardware in order to instrument the mathematical expressions which follow.

The first step executed by computing device 46 is the quantification of the unit normal vector N, passing through the center of the earth "O", and normal to the landing strip surface, plane M, at the selected altitude of the runway threshold crossing point D. The unit vector N is a vector which is collinear with a vector OD where O is the center of the Earth having coordinates (0, 0, 0) and the runway crossing point D having coordinates $(D_x, D_y, D_z)$. Accordingly, the unit normal vector is:

$$N = N_x x + N_y y + \tag{1}$$

$$N_z z = \frac{(D-O)}{|D-O|} = \frac{(D_x - 0)x + (D_y - 0)y + (D_z - 0)z}{[(D_x - 0)^2 + (D_y - 0)^2 + (D_z - 0)^2]^{\frac{1}{2}}}$$

The altitude difference between the selected altitude of the runway crossing point D (i.e., plane M) and the aircraft's present position A (x, y, z) is illustrated as the length of line segment d1. Distance d1 is the length of line segment A'-A which is a line normal to the plane M. The position of the aircraft relative to the runway threshold crossing point D is identified as vector V1. From vector algebra:

$$V1 = A - D \qquad (2)$$
$$= (A_x - D_x)x + (A_y - D_y)y + (A_z - D_z)z$$

It follows that the distance d1 is:

$$d1 = |V1 \text{ dot } N| \qquad (3)$$
$$= |(V1_x N_x + V1_y N_y + V1_z N_z)|$$

In order to calculate the lateral deviation, "LD", of the aircraft relative to the ground track B'-D, vectors describing the projection normal to plane M of the glide path vector V2, namely vector V4, and the aircraft position vector V1, namely vector V3, are first determined. Vector V3 is a vector from point D to point A', which is the same as the projection of vector V1 into plane M. Accordingly:

$$V3 = V1 - A'A \qquad (4)$$
$$= V1 - d1N$$
$$= [V1_x - (d1\ N_x)]x + [V1_y - (d1\ N_y)]y + [V1_z - (d1\ N_z)]z$$

Next, the ground track vector V4 is determined. This is accomplished by first calculating the distance d2 which is the distance between points B and B', where B' is in the plane M. Distance d2 is the altitude of the glide path identification point B above the runway threshold crossing point D. From vector analysis, it follows:

$$d2 = |V2 \text{ dot } N| \qquad (5)$$
$$= |(V2_x N_x + V2_y N_y + V2_z N_z)|$$

where vector V2 is the glide path vector from point D, having coordinates $D_x$, $D_y$, $D_z$, to point B, having coordinates $B_x$, $B_y$, $B_z$, and N is the unit vector defined above. That is: (V2=B−D)

It should be noted here that vector V2 is a selected glide path for a particular landing strip or runway, and is, of course, known. Further, vector V2 is defined by the known selected point coordinates "B" and "D" chosen for the particular runway.

Next, the ground track vector V4, is a vector from point D to point B' where point B' has coordinates ($B'_x$, $B'_y$, $B'_z$). Since V4 is the projection of vector V2 into plane M, from vector analysis it follows:

$$V4 = V2 - d2N \qquad (6)$$
$$= (V2_x - d2N_x)x + (V2_y - d2N_y)y + (V2_z - d2N_z)z$$

The lateral deviation, "LD", may now be determined as a function of the cross product of vectors V3 onto vector V4 as follows:

$$\text{lateral deviation} = LD = \frac{(V3 \times V4) \text{ dot } N}{|V4|} \qquad (7)$$

where N is defined in equation (1) and where:

$$V3 \times V4 = (V3_y V4_z - V4_y V3_z)x + (V3_x V4_z - V4_x V3_z)y + (V3_x V4_y - V4_x V3_y)z \qquad (8)$$

and
$$|V4| = (V4_x^2 + V4_y^2 + V4_z^2)^{\frac{1}{2}} \qquad (9)$$

The sign of the lateral deviation comes directly from the sign of the result of equation (7). That is, if the sign is positive, the lateral deviation is in the same direction as illustrated in FIG. 1, and an opposite sign indicates that the lateral deviation is a lateral deviation relative to the desired glide path opposite than that as illustrated.

The distance of the aircraft from the runway threshold crossing point D along the desired ground track is indicated by the distance d3, the length of the line segment between points D and C'. Distance d3 may be determined as follows:

$$d3 = \frac{|V3 \text{ dot } V4|}{|V4|} \qquad (10)$$
$$= \frac{(V3_x V4_x + V3_y V4_y + V3_z V4_z)}{|V4|}$$

Distance d4, the distance between points C' and C, defines the desired altitude of the aircraft along the desired glide path BD. The distance d4 may be determined by a simple ratio of similar triangles as follows:

$$\frac{d2}{|V4|} = \frac{d4}{d3} \qquad (11)$$

from (11) it follows:

$$d4 = \frac{(d2)(d3)}{|V4|} \qquad (12)$$

Accordingly, the vertical deviation as previously defined may now be determined. That is, the vertical deviation, "VD", is the difference between the distance d1, which is a function of the present position of the aircraft, and the distance d4 which is the desired position of the aircraft on glide path BD, thus:

$$\text{Vertical Deviation} = d1 - d4 \qquad (13)$$

In the previous discussion, it has been shown that two points B and D define a glide path relative to the runway threshold crossing point D. In turn, knowledge of the actual global position coordinates of these two points, namely D (x, y, z) and B (x, y, z), and knowledge of the position of the aircraft defined by the coordinates A (x, y, z) is the only information required by the onboard computer 46 for calculating the lateral deviation, "LD", and vertical deviation, "VD", relative to the selected glide path defined by points B and D.

In turn, data representative of LD and VD may be subsequently processed by control signal processing section 46c of computer device 40 for generating autopilot data 50 for autopilot 60 as will now be further described.

As is well understood in the prior art, existing ILS systems provide steering signals to the autopilot in signal quantity units called Difference in Depth of Modulation (DDMs). More specifically, on-board ILS systems components provide steering signals referred to as lateral deviation DDM and vertical deviation DDM. As is well known, these steering signals are derived from the electromagnetic signal intensities of different frequencies radiated by transmitters in the vicinity of the landing strip. The vertical and the lateral deviation DDMs are essentially proportional to the actual lateral deviation and the vertical deviation as described with reference to FIG. 1. Accordingly, the lateral deviation and the vertical deviation derived above may be scaled to provide the "look and feel" of a DDM so that such signals can be fed directly into an autopilot in place of standard and customary ILS signals commonly employed in such systems, as well as in MLS systems.

However, in the present invention, the scaled DDM signals can be further characterized by gain control signals as a function of the ground track distance relative to the runway threshold crossing point D, namely distance d3 defined between points C' and D, or alternatively the magnitude of vector V3. In this situation, computer 46 can provide information which simulates an ILS beam lateral and vertical difference in depth of modulation DDM as follows:

$$DDM(\text{Lateral}) = \frac{LD}{F(d)} * G(d) \quad (14)$$

where:
LD is the lateral deviation expressed in equation (7),
F(d)=Lateral deviation scale factor which is a function of the distance of the aircraft from the runway threshold crossing point, and
G(d)=DDM scale factor which is a function of the distance of the aircraft from the runway threshold crossing point. In a real application of the GPS system this factor may simplify to a constant.

$$DDM(\text{Vertical}) = \frac{\text{Vert Dev}}{J(d)} * K(d)$$

where:
VD is the vertical deviation expressed in equation (14),
J(d)=Vertical Deviation Scale factor which is a function of the distance of the aircraft from the runway threshold crossing point.
and
K(d)=DDM scale factor which is a function of the distance of the aircraft from the runway threshold crossing point.

Of course, the distance selected may be other than that determined relative to the runway threshold crossing point, e.g., a point on the ground at the end of the runway, and is within the spirit and scope of the present invention.

Control signal processing section 46c may perform the computation as just described, or other control schemes as desired to properly direct autopilot 60.

In accordance with the present invention, the onboard station, which includes the GPS receiver, the data link receiver and computing device, may determine the glide path and control signals for subsequent flight control without the use of an extensive data base and with no flight management system involvement. In the present invention a flight management system may still be used to fly the curved approach to the final straight-in segment, i.e., the glide path, or an additional point or points from the fixed ground station could be used to construct a curve. In this embodiment, the aircraft implementation may be designed in such a way that when the ILS or MLS function was engaged in the final approach segment the autopilot would use a localizer and glide slope deviations, i.e., lateral deviation and vertical deviation, supplied by the onboard independent computer 46 through the ILS/MLS input to the autopilot. The final flight segment can then be started at an altitude high enough to assure that the flight management system will be disengaged before the aircraft has descended below presently allowable altitudes as is done in today's architecture.

The advantages, among others, in accordance with the present invention allow for a "drop in" replacement for ILS or MLS systems. It allows for a glide path change in the glide slope as transmitted by the ground station by transmission of the global position of points B (x, y, z) and D (x, y, z).

In contrast with present day autopilots which respond to DDMs derived from electromagnetic wave signals, autopilots may be redesigned to permit use of only the "calculated" lateral deviation (LD), vertical deviation (VD), and distance (d3) from the runway threshold crossing point derived in manner in accordance with the present invention, as opposed to the less accurate or reliable differences in depth modulation signals modified by appropriate controlled gain functions in the usual ILS and MLS systems.

As is apparent to those skilled in the art, when the ground station transmits the actual global position coordinates of the runway threshold crossing point D, and a second point B, where B and D define the glide path, there is no need for any database requiring knowledge of specific glide paths corresponding to specific airport runways. This, of course, reduces the need for additional hardware on the aircraft and reduces the criticality of existing hardware. Therefore, only the hardware of the present invention needs to be FAA certified, whereas the existing aircraft navigation hardware, e.g. inertial nav and autopilot hardware, does not need to be re-certified. More specifically, since the system does not require any modification to the autopilot or the flight management system in its present form, there is not a need for recertification of any other hardware other than the GPS receiver and data link receiver in accordance with the rpesent invention.

It should be recognized by those skilled in the art that a single fixed ground station may provide data of a plurality of runways so that approaching aircraft may select the appropriate glide path for a specific runway by a simple channel selection of the data link transmitter/receiver system.

Figures 3, 4:
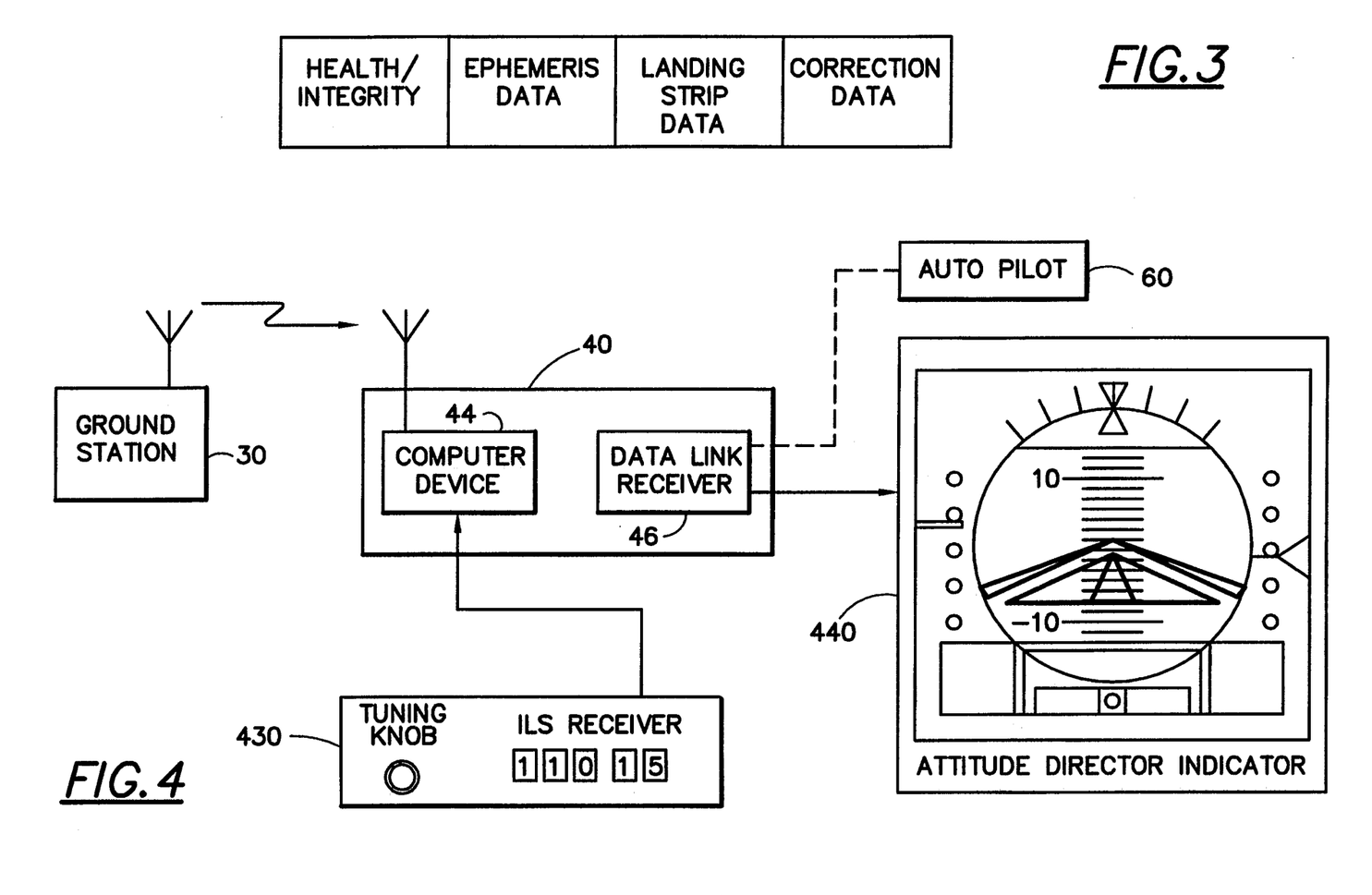
FIG. 3 is data packet diagram illustrating the information transmitted and received through a data link in accordance with the present invention.
FIG. 4 is a system block diagram of the present invention with landing indicating equipment, or alternately an autopilot.

FIG. 3 shows one example of a message which may be transmitted by the data link transmitter 36. The message may include health/integrity data 310, ephermeris data 320, runway coordinates/runway identification data 330 followed by satellite correction data 340, i.e., pseudo range corrections, i.e., C(s). The health/integrity message provides the required information used to confirm the validity of the satellite signals used by both the ground station and aircraft position determinations in a manner which is customary. Ephemeris data provides satellite orbital information to the aircraft to ensure that the ground station and aircraft are operating from the same set of ephemeris data. The pseudo range corrections provide differential correction information used for increasing GPS accuracy in accordance with known art. The runway coordinates/identification provides the aircraft with runway coordinates, e.g., B (x, y, z) and D (x, y, z), from which to calculate the final approach and flight path as described with reference to FIG. 1. Further, the runway coordinates/identification information may contain other enhancement information such as the runway identifier, runway threshold crossing height in terms of its actual global position, and runway threshold crossing altitude as desired.

FIG. 4 is another block diagram similar to FIG. 2. In the following Figures, similar functioning component shown in the Figures as those in FIG. 2 have retained the same numeral designation. In FIG. 4, thereshown is the scenario wherefore an aircraft is not equipped with a flight management system or autopilot. In this situation, the pilot may input the ILS receiver frequency in a manual control 430 as an input to the data link receiver 44 for appropriately obtaining the desired coordinates for the glide path associated with the runway having the inputted ILS frequency. As before, the computer device 46 calculates the lateral and vertical deviation from the desired glide path (B-D) and provides them as input to a landing display altitude director indicator 440 for manual flight aircraft approaches.

Also shown in FIG. 4 is an alternate arrangement including an aircraft equipped with an autopilot 60 but is not equipped with a flight management system. This system operates in a similar manner except that the determined lateral and vertical deviations from the glide path are made for control of the autopilot in addition to signals to the flight director.

Figure 5:
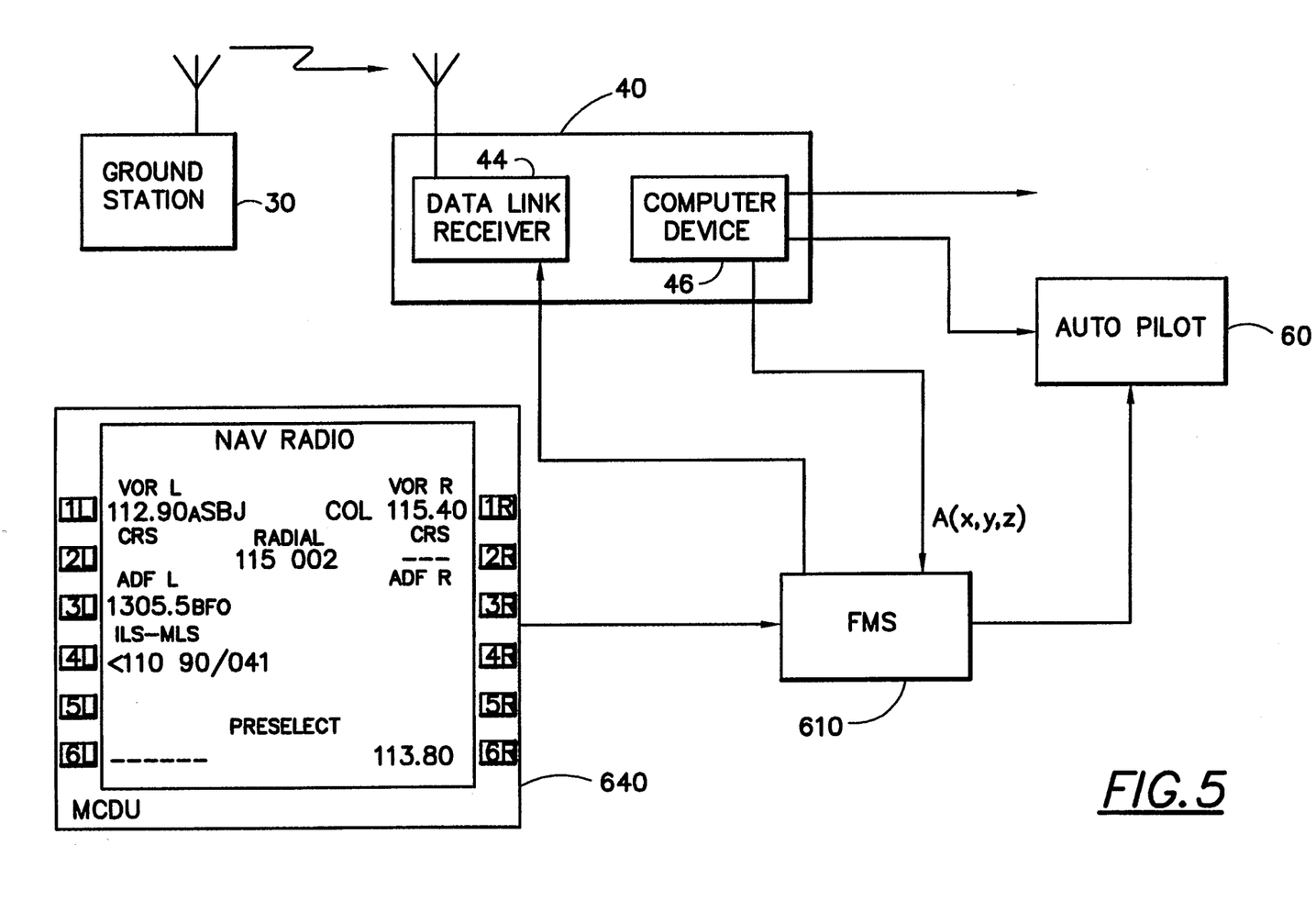
FIG. 5 is a system block diagram of the present invention with a flight management system and autopilot.

Shown in FIG. 5, similar to FIG. 4, is a system in accordance with the present invention in which the aircraft includes a flight management system 610, including input controller 640, with autopilot 60. This system functions similar to that in FIG. 4 except that the corrected global position of the aircraft A (x, y, z) is fed into the flight management system 610, and the flight management system 610 can electronically control or provide the runway selection identifier into the data link receiver for proper runway coordinate point information selection.

Figure 6:
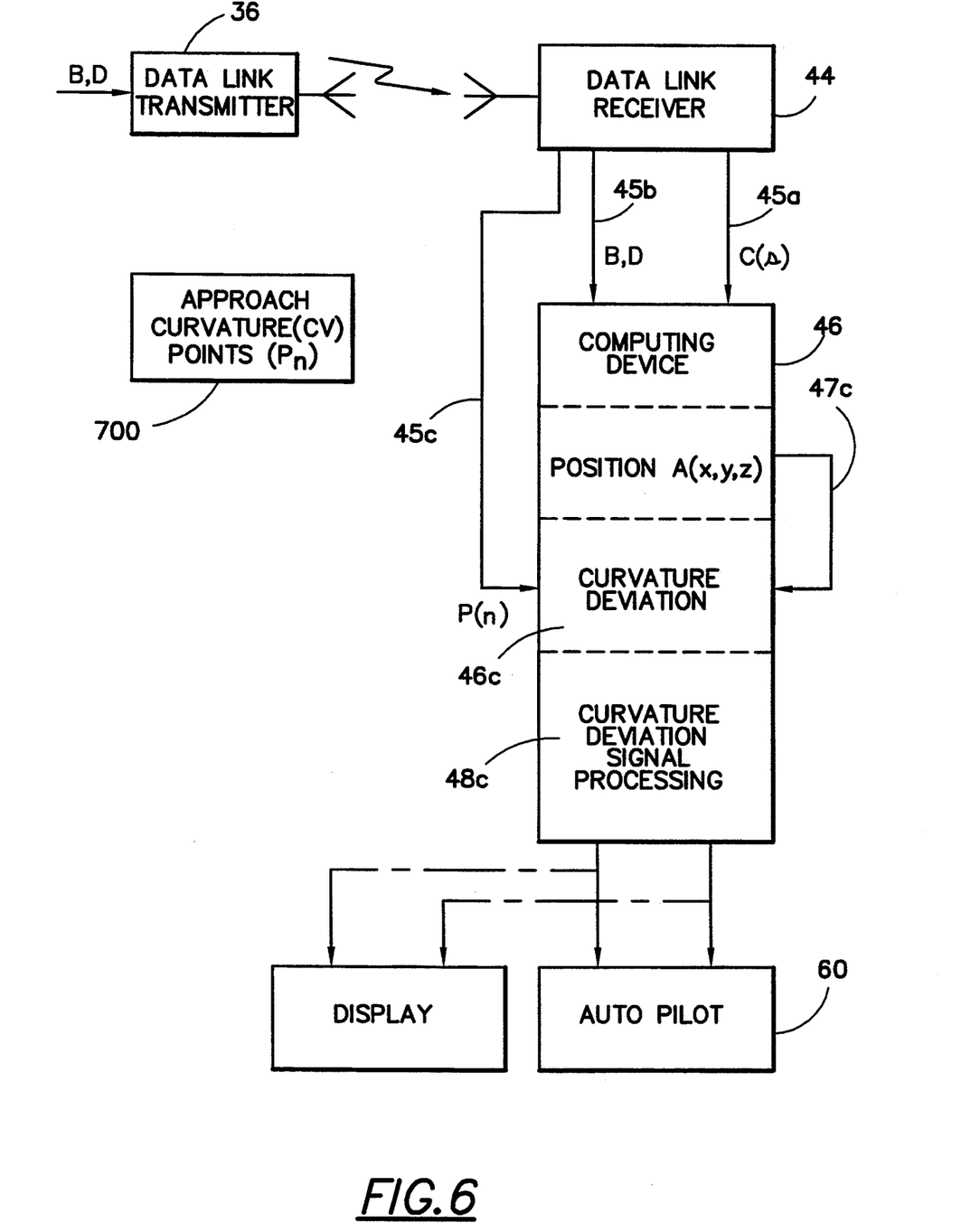
FIG. 6 is a block diagram of another embodiment of the present invention.

Illustrated in FIG. 6 is another embodiment of the present invention in which the similar function components as those shown in FIG. 2 have retained the same numeral designations. In FIG. 6, the data link transmitter further includes inputs from approach curvature data block 700. Block 700 provides actual global position data, P(n), for constructing a flight path approach curvature intended to be flown by an aircraft before descending down the glide path. In turn, data link receiver 44 provides data on signal line 45c to computing device 46 having a curvature deviation section 46c. Since in the present invention the corrected global position of the aircraft is known, the curvature deviation section may then compute the deviations between the current aircraft position and the known approach curvature points P(n). In turn, curvature deviation signal processing section 48c of computer device 46 may subsequently provide signal inputs to an autopilot 60 or other navigating or indicating equipment 70.

It should be understood that there are many types of receivers for differential as well as non-differential positioning by satellite which can be incorporated in the system of the present invention. Further, there are many types of data link transmitters and receivers which may be incorporated in the present invention and may have a plurality of channels and/or frequencies which may be utilized, including those incorporated in ILS and MLS systems.

Furthermore, it should be recognized that only one ground station has been associated with one landing strip or runway, however, it is within the scope of the present invention that the data link transmitter may transmit a variety of distinct data packets corresponding to a plurality of landing strips on either the same frequency channel or a plurality of different channels, and is also intended to be within the scope of the present invention.

It should be noted that the vector analysis presented is an exact method for an earth centered sphere. However, it is within the scope of the present invention to incorporate other mathematical expressions beyond that shown herein to arrive at the same intended function as disclosed herein, i.e., lateral and vertical deviation from the desired glide path. For example, corrections may be required for an "elliptical" earth, or other fixed coordinate system for global positioning reference system.

Lastly, although it has been shown that only two points need be communicated from the ground station to the aircraft to define the glide path, one being the runway threshold crossing point, other information may also be transmitted and is intended to be within the spirit and scope of the present invention, such as provided by various enhancements not shown herein, but useful to those artisans in flight management.

The embodiments of an invention in which an exclusive property or right is claimed are defined as follows:

1. A landing assistance system utilizing a global positioning system which employs a plurality of satellites, where each of said satellites transmits signals containing satellite data, and which said global positioning system employs a global positioning system receiver means for receiving said satellite signals and retrieving said satellite data therefrom, and which said satellite data is sufficient to determine the range between each satellite and said global positioning receiver, and which said satellite data from a plurality of satellites to determine the global position of said receiver, the landing assistance system comprising:

a ground station located in the vicinity of at least a first aircraft landing strip, and said ground station having a known reference global position, said ground station including,
  (i) a differential global positioning system ground station including a global positioning system receiver for retrieving satellite data from selected ones of said satellites, and correction means for deriving global positioning system differential correction data as a function of said reference global position and said satellite data, and
  (ii) data link transmitter means for transmitting data signals containing at least (1) said correction data, and (2) data representative of the actual global position of at least first and second glide path points which define a selected aircraft landing glide path for an aircraft landing on said first landing strip; and a mobile station on board an aircraft including,
  (i) data link receiver means for receiving said data signals containing said correction data and said data representative of said actual global position of said first and second glide path points, and
  (ii) a global positioning system receiver means for selectively receiving selected ones of said satellite signals, and retrieving said satellite data therefrom.

2. The landing system of claim 1 wherein said mobile station further includes data processing means for operating on satellite data from said mobile station global positioning system receiver means and said correction data for deriving therefrom a corrected global position of said mobile station global positioning system receiver means, and aircraft control means responsive to the deviation between said corrected global position of said mobile station global positioning system receiver means and said selected aircraft landing glide path defined by said first and second glide path points.

3. The landing system of claim 1 wherein said mobile station further includes data processing means for operating on satellite data from said mobile station global positioning system receiver means and said correction data for deriving therefrom a corrected global position of said mobile station global positioning system receiver means, and aircraft landing indicating means responsive to the deviation between said corrected global position of said mobile station global positioning system receiver means and said selected aircraft landing glide path defined by said first and second glide path points.

4. The landing system of claim 1 wherein said mobile station further includes data processing means for operating on satellite data from said mobile station global positioning system receiver means and said correction data for deriving therefrom a corrected global position of said mobile station global positioning system receiver means, and deriving the lateral deviation and vertical deviation between said corrected global position from said selected aircraft landing glide path defined by said first and second glide path points.

5. The landing system of claim 1 wherein said global positioning system receiver means of said ground station and said mobile station include means for deriving pseudo range and pseudo range rate data from said satellite data from each of said satellite signals.

6. The landing assistance system of claim 1 wherein said correction data includes pseudo range error and pseudo range rate error separately determined for each of said satellites.

7. The landing system of claim 1 wherein one of said glide path points is the runway threshold crossing point generally located a selected distance above the landing strip and generally at one end thereof.

8. The landing assistance system of claim 1 wherein said data signals further includes data representative of the global position of at least a second pair of glide path points which define a selected aircraft landing glide path for an aircraft landing on a second landing strip.

9. The landing assistance system of claim 1 wherein said global positioning system is in accordance with NAVSTAR-GPS standards.

10. The landing assistance system of claim 1 wherein said satellite data contains information representative of the global position of the corresponding satellite.

11. The landing assistance system of claim 1 wherein said global position of said satellite, said reference global position of said ground station, the global position of said receiver, and said actual global position of said first and second glide path points are all defined in one coordinate system.

12. The landing assistance system of claim 4 wherein said coordinate system is an earth-centered, earth-fixed coordinate system.

13. A landing assistance system utilizing a global positioning system which employs a plurality of satellites, where each of said satellites transmits signals containing satellite data, and which said global positioning system employs a global positioning system receiver means for receiving said satellite signals and retrieving said satellite data therefrom, and which said satellite data is sufficient to determine the range between each satellite and said global positioning receiver, and which said satellite data from a plurality of satellites is sufficient to determine the global position of said receiver, the landing assistance system comprising:

a ground station located in the vicinity of at least a first aircraft landing strip, and said ground station having a known reference global position, said ground station including
(i) a differential global positioning system ground station including a global positioning system receiver for retrieving satellite data from selected ones of said satellites, and correction means for deriving global positioning system differential correction data as a function of said reference global position and said satellite data, and
(ii) data link transmitter means for transmitting data signals containing at least (1) said correction data, and (2) data representative of the actual global position of at least a plurality of flight path points which define a selected curved aircraft landing approach flight path for said first landing strip; and a mobile station on board an aircraft including,
(i) data link receiver means for receiving said data signals containing said correction data and data representative of said actual global position of said first and second glide path points, and
(ii) a global positioning system receiver means for selectively receiving selected ones of said satellite signals, and retrieving said satellite data therefrom.

14. The landing assistance system of claim 13 wherein mobile station further includes data processing means for operating on satellite data from said mobile station global positioning system receiver means and said correction data for deriving therefrom a corrected global position of said mobile station global positioning system receiver means, and aircraft control means responsive to the deviation between said corrected global position of said mobile station global positioning system receiver means said selected curved aircraft landing approach flight path defined by said plurality of flight path points.

15. The landing assistance system of claim 13 wherein mobile station further includes data processing means for operating on satellite data from said mobile station global positioning system receiver means and said correction data for deriving therefrom a corrected global position of said mobile station global positioning system receiver means, and aircraft landing indicating means responsive to the deviation between said corrected global position of said mobile station global positioning system receiver means said selected curved aircraft landing approach flight path defined by said plurality of flight path points.

16. The landing assistance system of claim 13 wherein mobile station further includes data processing means for operating on satellite data from said mobile station global positioning system receiver means and said correction data for deriving therefrom a corrected global position of said mobile station global positioning system receiver means, and deriving the lateral and vertical deviation between said corrected global position of said mobile station global positioning system receiver means said selected curved aircraft landing approach flight path defined by said plurality of flight path points.

17. The landing system of claim 13 wherein said global positioning system receiver means of said ground station and said mobile station include means for deriving pseudo range and pseudo range rate data from said satellite data from each of said satellite signals.

18. The landing assistance system of claim 17 wherein said correction data includes pseudo range error and pseudo range rate error separately determined for each of said satellites.

19. The landing assistance system of claim 13 wherein said data signals further includes data representative of the actual global position of at least first and second glide path points which define a selected aircraft landing glide path for an aircraft landing on said first landing strip.

20. The landing assistance system of claim 13 wherein said global positioning system is in accordance with NAVSTAR-GPS standards.

21. The landing assistance system of claim 13 wherein said satellite data contains information representative of the global position of the corresponding satellite.

22. The landing assistance system of claim 13 wherein said global position of said satellite, said reference global position of said ground station, the global position of said receiver, and said actual global position of said curved aircraft landing approach flight path points are all defined in one coordinate system.

23. The landing assistance system of claim 13 where said coordinate system is an earth-centered, earth-fixed coordinate system.

* * * * *

UNITED STATES PATENT AND TRADEMARK OFFICE
CERTIFICATE OF CORRECTION

PATENT NO. : 5,361,212
DATED : November 1, 1994
INVENTOR(S) : Kim A. Class, Randolph G. Hartman, Brett J. Helgeson It is certified that error appears in the above-identified patent and that said Letters Patent is hereby corrected as shown below:

Column 12, line 37, after "satellites" insert
    --is sufficient--.

Column 13, line 38, cancel "1" and insert --5--;
         line 63, cancel "4" and insert --11--.

Signed and Sealed this

Seventh Day of March, 1995

Attest:

BRUCE LEHMAN

Attesting Officer

Commissioner of Patents and Trademarks